May 26, 1964  C. O. CARLSON ETAL  3,134,297
OPTICAL INFORMATION DISPLAY SYSTEM HAVING METACHROMATIC MEANS
Filed Dec. 27, 1960  2 Sheets-Sheet 2

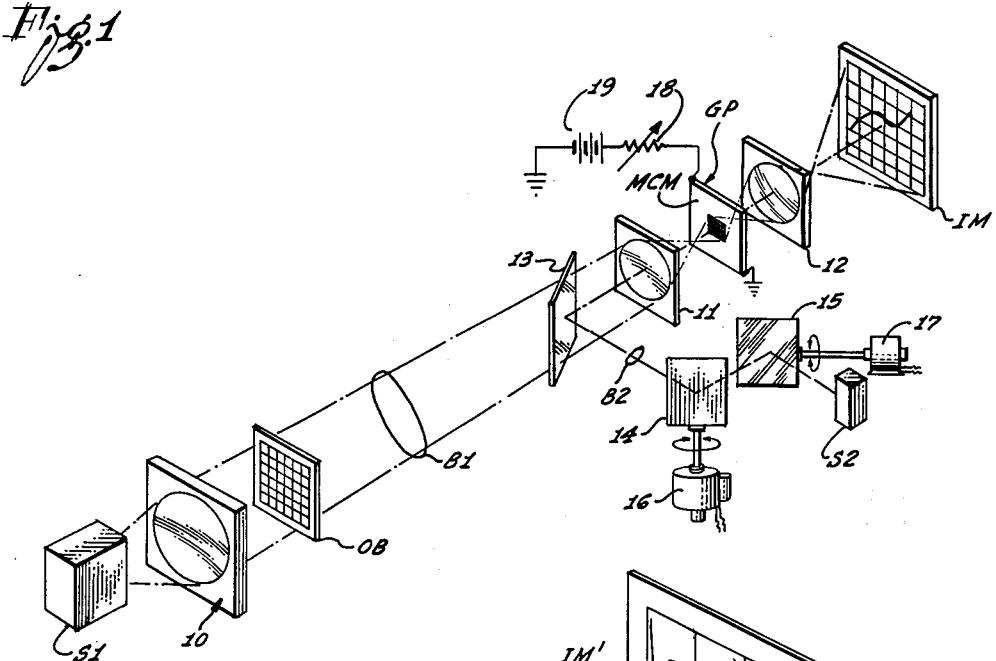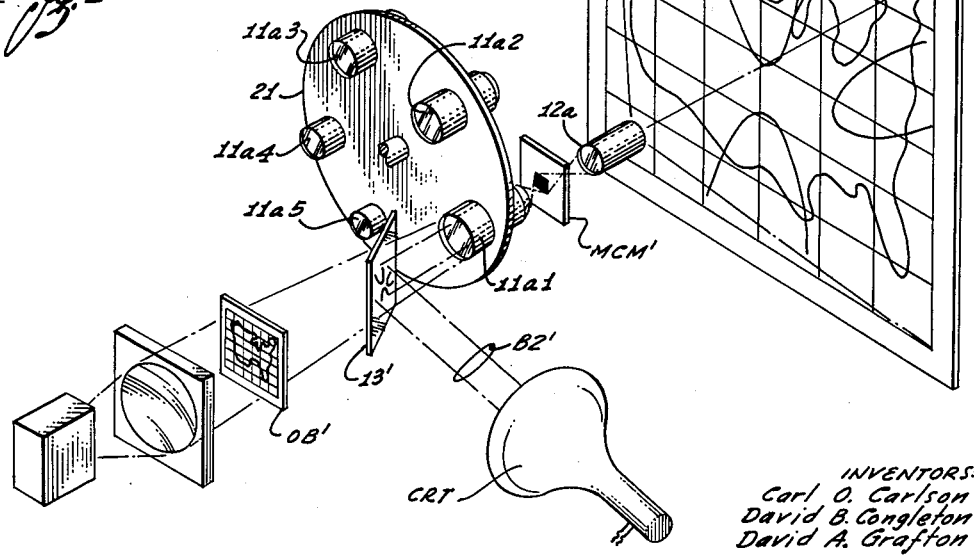

INVENTORS:
Carl O. Carlson
David B. Congleton
David A. Grafton

By Louis A. Kline
John J. Matlago
Their Attorneys 3,134,297
OPTICAL INFORMATION DISPLAY SYSTEM
HAVING METACHROMATIC MEANS
Carl O. Carlson, Los Angeles, David B. Congleton, Manhattan Beach, and David A. Grafton, Santa Monica, Calif., assignors to The National Cash Register Company, Dayton, Ohio, a corporation of Maryland
Filed Dec. 27, 1960, Ser. No. 78,389
17 Claims. (Cl. 88—24)

This invention relates to optical data or information display apparatus and procedures and more particularly to apparatus and procedures for the automatic display of changing information such as might be encountered in the fields of aircraft control, weather-plotting, and the like.

Numerous cathode ray tube devices have been employed in the past for display of information, for example, radar scopes and the like. While cathode ray tubes are readily adaptable for instantaneous display of varying information, the images produced thereby cannot be retained for any length of time so that the operator can observe a history of the changing information. Although photographic means can be employed with such devices to store images of past events, such means require time and extra effort for developing the photographic film and the end results are generally unsatisfactory. While various types of plotting boards have been devised using a scriber by which an image can be produced and retained; such images cannot be readily erased to provide the degree of flexibility desired in a variety of display situations. There is a need, then, for a display system in which the image production and persistency can be controllably varied for simultaneous display and storage of information represented by the image.

In a co-pending application of Carl O. Carlson, filed October 12, 1959, Serial No 845,781, now Patent No. 3,085,469, there is disclosed an optical information processing apparatus and procedures whereby an information-containing beam of light is transmitted through a metachromatic film or plate, the point-to-point transmissivity of which may be varied in response to expsure to ultraviolet light, to alter the intensity distribution throughout the light beam thereby altering the information represented by this intensity distribution. The ability of a metachromatic material to change its spectral absorbancy (or transmissivity) of visible light by exposure to ultraviolet radiation makes it particularly applicable to the field of visual display systems. The particular characteristics of metachromatic films when used as a modulator of a projected image such as to cause additional lines, graphs, numeric or alphabetic data to be superimposed upon the projected image allows for a very flexible display system. The superposition may be of any variable data upon a fixed or semifixed projection image and it is most desirable to have such a display system wherein optimum "writing times" of such superimposed characters can be achieved for a particular display purpose. This requires a means for controlled variation of the writing time and erasure time and the factors effecting these entities, such as the intensity of the illumination obtainable from a given light source and decay rate of the metachromatic material.

It is the major object of this invention to provide an improved information display apparatus. Another object of this invention is the provision of an improved apparatus for display of varying information. It is still another object of this invention to provide an improved apparatus for simultaneous storage and display of information. It is still another object of the invention to provide an improved display system wherein the "writing" time and persistency of the displayed image may be controllably varied.

A major feature of the invention resides in a display system wherein the information in the form of an optical image is projected onto a first image plane in which resides a metachromatic film characterized by a point-to-point variation in the transmissivity thereof in response to auxiliary radiation representing additional information to be included in the image to be displayed in a second image plane or viewing screen. The metachromatic film in essence serves as an object plane upon which the varying information is continually superimposed over the projected image of a fixed information grid and from which the display image is instantaneously achieved by the second projection means of the system. Since the writing time characteristic of this metachromatic film varies inversely with the intensity of the writing light beam, a second feature of the invention resides in the provision of means for demagnifying or reducing the image as projected on the metachromatic object plane and means to vary the degree of demagnification to vary the intensity of the writing light beam.

Other objects, advantages, and features will become apparent from consideration of the following description when taken in conjunction with the appended claims and the drawings wherein:

FIG. 1 is a pictorial view of an exemplary system employing features of the invention;

FIG. 2 is a pictorial view of an alternative embodiment of the invention; and

Figure 3:
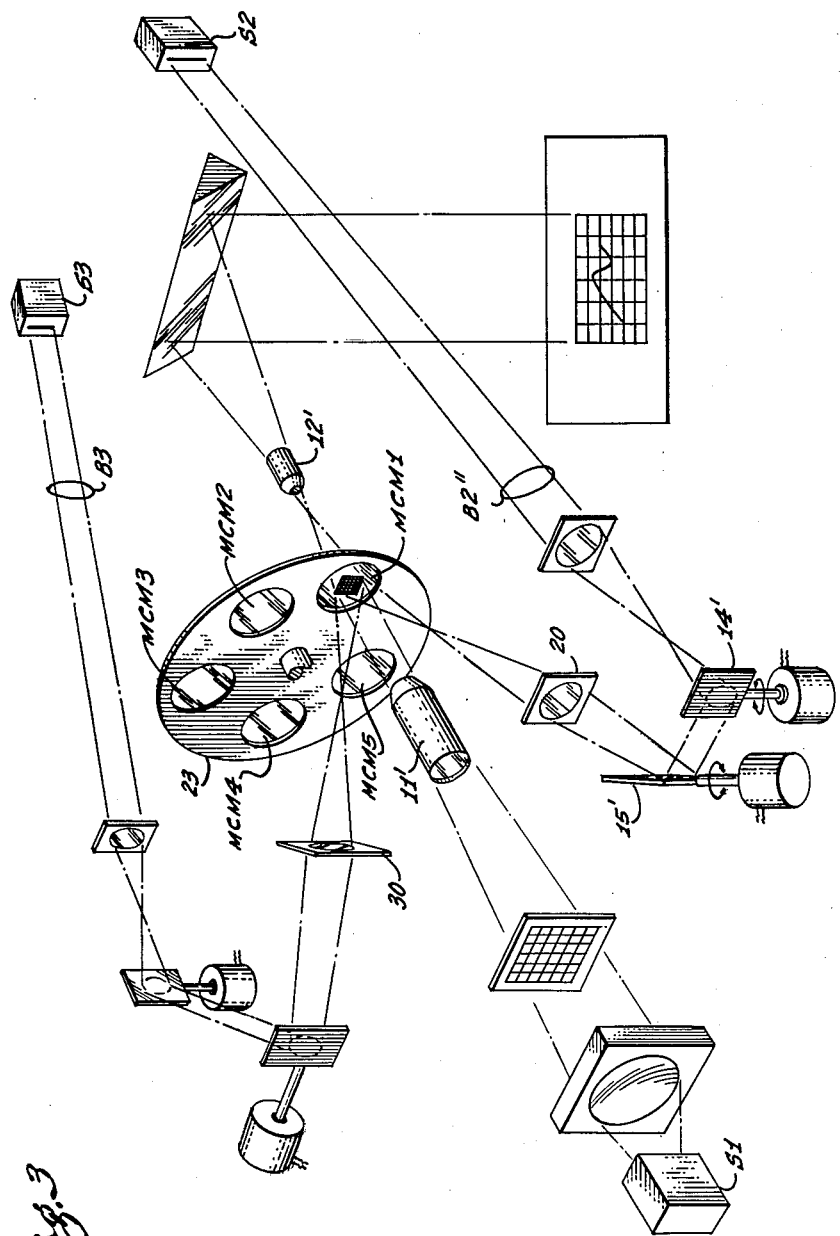
FIG. 3 is a pictorial view of a second alternative embodiment of the invention.

The present invention entails a utilization of a metachromatic material which is disposed in a light beam at the image plane formed by a suitable optical system into which information is submitted in the form of an optical pattern of both primary radiation which may be of light in any given waveband but preferably not in the blue-ultraviolet spectrum and auxiliary radiation which may be ultraviolet light. The primary radiation pattern normally represents fixed or semi-fixed information such as a background map or grid and the auxiliary radiation is normally used to write variable information in the form of a "trace" on the metachromatic material, portions of which become opaque in response thereto, so that the metachromatic material transmits only a portion of the primary radiation in the form of an altered optical pattern to a projection lens system for display. Thus, by suitably varying the intensity and/or areal distribution of the auxiliary radiation projected onto the plane of the material, desired alternation of the primary information-containing light beam may be readily accomplished. Materials of the above-mentioned types referred to as metachromatic materials (hereinafter abbreviated, MC materials) are materials whose radiation-transmission characteristics are controllably variable and are reversible due to natural "decay" or to decay induced in response to variations of applied energy such as heat and/or light. Such MC materials include, for example, elementary and complex spiropyrans and derivatives thereof. Specific examples of exemplary classes of MC materials are set out hereinafter in this description.

Referring now to FIG. 1, the system embodying the present invention therein shown is formed of a light source S1 in conjunction with a condensing lens 10 to form a converging beam B1 which is directed toward writing lens 11. Light source S1 may be selected to be of the type known in the art as a "point" light source, although a slit source or a source with two dimensional aperture may be employed depending upon the end result to be obtained by this system. Furthermore, radiation furnished by source S1 may be selected to be monochromatic or restricted to a particular "wide" frequency band of the optical portion of the electromagnetic wave spectrum.

Inserted in beam B1 is object means OB which is placed in relation to the writing lens system 11 to form an image in a corresponding image plane at which is placed translucent or transparent metachromatic film MCM. The image thus formed is then projected by a projection lens system 12 onto a suitable display screen IM.

In order to vary the information represented by the image projected onto and through metachromatic means MCM an auxiliary light source S2 is provided to produce beam B2 of ultraviolet light which is directed towards dichroic filter 13 placed in the optical path of beam B1 between writing lens 11 and the object OB. Filter 13 is chosen to have the properties of reflecting ultraviolet radiation, that is, radiation of wave lengths in the region below approximately 4,000 angstroms; and will pass visible light, for example, green light having wave lengths in a region between 5,000 and 6,000 angstroms. At filter 13, the ultraviolet radiation in beam B2 is then reflected towards writing lens 11 which in turn projects this radiation onto the metachromatic material at MCM.

To supply information to light beam B2, the optical path of beam B2 is arranged for reflection of this beam off of two mirror surfaces 14 and 15 which are respectively rotated by servo motors 16 and 17 which in turn receive signals from a computer or any other information source. The axes of rotation of the respective mirrors are arranged to be at right angles with one another as viewed from the optical path so that if the information imparted to light beam B2 is represented in terms of $x$ and $y$ coordinates, rotation of mirror surface 14 would represent the $x$ coordinate movement while rotation of mirror 15 would represent the $y$ coordinate movement. Upon respective rotations of the two mirror surfaces, then, a trace will be formed at MCM which trace is represented by areas of the metachromatic material which have changed to a relative opaque state in response to the auxiliary radiation.

Source S1 also may be of a type to supply ultraviolet radiation to writing lens 11 and MCM when it is desired to retain the fixed or semi-fixed information image on the MC material at MCM.

Projection lens 12 is so arranged that the image existing in the plane of metachromatic material at MCM, as altered by the relatively opaque areas therein, serves as an object for the display image projected onto display means IM. It is apparent that the more highly excited areal portions of metachromatic means MCM reduce the amount of primary radiation passing therethrough and this reduction is in a definite controlled manner so that the display image represents not only the information contained in the object grid OB but also the information represented by movement of servo mirrors 14 and 15.

Not only may the metachromatic material be changed to an opaque state by radiation of ultraviolet light, but this opaque condition may be "erased" by the application of infrared radiation which may be supplied to the metachromatic material in a manner similar to that utilized to provide writing beam B2. In addition, changes in the opaque condition of respective areas of the metachromatic material may be brought about by relying upon the natural decay of such opaque areas which may be increased by raising the temperature of the material. To this end, there is shown in FIG. 1, electrical means including any type of electrical source such as battery 19 and variable resistance 18 which are connected to a thin transparent gold film GP applied to one side of the metachromatic means which may include a glass plate type of inclosure. This resistance type of heating is considered to be old in the art and any other suitable method of increasing the temperature of the metachromatic material may be used. When it is desired to increase the persistency of the opaque state of the metachromatic material, the natural decay may be reduced by cooling of the material and to this end the entire optical system may be placed in a refrigerated container or other means for producing a controlled atmosphere so that the metachromatic material will normally reside at a relatively cooler temperature which can be increased by any desired amount by the above-mentioned heating means. By placing the entire optical system in a controlled atmosphere in this manner, optical defects which may be brought about by expansion and contraction of the various lens systems are reduced to a minimum. Other means for variations in the primary radiation absorbancy of the metachromatic material are discussed in the above-mentioned Carlson application Serial No. 845,781.

In those applications of the invention wherein long continued use of the MC material is contemplated, the material may be incorporated in a movable film or the like whereby new portions of areas of the MC material may be substituted either at intervals or continuously at a very low speed for the fatigued portions of this material. Such film may be handled, and moved in a fashion similar to that used for flexible photographic film. Other means for moving the film for purposes of storage will hereinafter be disclosed.

As a typical specific example of MC material, a film may be formed by solidification of a poured mixture of the following, the proportions being in terms of parts by weight:

| | |
|---|---|
| Eastman "Half-Second Butyrate #EAR–381" | 25.0 |
| Chlorinated diphenyl having 60% by weight of chlorine | 25.0 |
| Toluene | 28.0 |
| Methyl ethyl ketone | 22.0 |
| Ethanol (95%) | 5.4 |
| Butanol | 0.6 |
| 6' - nitro - 8' - methoxy - 1,3,3 - trimethylindolinobenzopyrylospiran | 0.375 |

Further information on the "Half-Second Butyrate" may be obtained from a publication bearing this title and copyrighted in 1955 by the Tennessee Eastman Company. This film is mounted between thin quartz-glass sheets to form a "slide." This slide also may be a transparent plastic coating on a suitable substrate. The film, thus described, exhibits high absorbancy in both excited and unexcited states to excitation in the ultraviolet region of the spectrum; but low absorbancy unexcited and high absorbancy excited, in the waveband 550 to 600 $m\mu$; the ambient temperature preferably being about 6 degrees centigrade for an extended decay time and the excitant being ultraviolet radiation. Other examples of metachromatic means are discussed in the above-mentioned Carlson application Serial No. 845,781. From the variety of materials therein disclosed, there may be selected specific materials which are characterized by particular decay rates and capabilities of being excited by radiation of particular frequencies for applications to a variety of situations or conditions.

Devices other than the $x$ and $y$ servo motors, as shown in FIG. 1, may be utilized to supply information to the auxiliary radiation writing beam. For example, galvanometer units similar to those used in seismographic recorders may be used in place of the above-mentioned servo motors. Another system might utilize fixed mirrors with the light source S2 being movable in a two-dimensional plane. This latter system overcomes the problem of information distortion due to the non-linear relationship between the image reflection and the rotating mirror which must be corrected with a non-linear cam in the servo motor. As shown in FIG. 2, information in the form of an optical image may be taken directly from the face of cathode ray tube CRT in the form of ultraviolet radiation to form writing beam B2' which is reflected off of dichroic filter 13' toward writing lens 11a1. As in the case of the servo mirrors, care must be taken to fulfill the requirement that the optical distance between the image as formed at metachromatic means MCM' and the face of cathode ray tube CRT is the same as the optical distance between MCM' and object means OB'. The requirement may be dispensed with when an off-axis writing system is used such as disclosed in FIG. 3 wherein the writing beam B2" is reflected off of y servo mirror 15' to auxiliary writing lens 20 which projects beam B2" directly onto MCM thereby dispensing with the need for dichroic filter. A particular advantage of this off-axis writing system is that a plurality of auxiliary writing beams may be employed without utilization of dichroic filters which offer difficulties, when operated in a cascading fashion, in regard to both the spectral bandwidth and transmitted intensity. Because of the disadvantages of the dichroic filters, it will be apparent that if a plurality of writing beams were used employing a corresponding number of filters, the amount of light arriving at MCM would be insufficient to activate the material as rapidly as under more ideal operating conditions.

Various means can be employed to further enhance the intensity of primary and auxiliary radiation to obtain optimum response from the MC material. Since for a certain energy density impinging upon the MC material, the material must be exposed for a given length of time in order to effect a change to an opaque state of sufficient optical density when the auxiliary radiation is of proper frequencies, the duration of the writing time for a full scale image may be expressed as a function of both the particular MC material employed and the intensity of the auxiliary radiation obtained from source S2. For many applications, this writing time may be adequate where the information being plotted is changing at a moderately slow rate. However, where the information to be plotted is changing at a relatively faster rate the required writing time must be sufficiently reduced or else the writing beam will register only as a spot on the image plane at MCM and will not register as a trace of sufficient optical density, as might be required. In such cases the illumination intensity could be increased, however, this requires additional power to be supplied to the illumination source which might place undue limitations upon the utilization of such a display apparatus in many situations. Therefore, rather than increase the illumination intensity at the illumination source, the intensity is increased at MCM by a reduction of the projected image. Such an image reduction might be by a factor of as much as 100 or 200. It should be mentioned at this point that such a reduction is primarily possible because of the high resolution characteristic of MC films such as described above and that the only practical limitation upon the amount of demagnification lies in the optical systems being utilized. When a different writing time is desired, the intensity of the writing beam can be varied by varying the demagnification. To this end there is shown in FIG. 2 a plurality of writing lens systems 11ai mounted on a rotatable turret 21 and a corresponding means may be employed to vary the magnification of projection lens 12a so that the image displayed at IM' will not be varied by a change of optical system to achieve the desired writing time. An obvious additional advantage of such demagnification is the small area of MC material required at MCM which results in cost savings, small space requirements and other advantages.

Another advantage of utilizing demagnified images is the enhanced storage capability of a system employing MC materials. For example, a display system which has the capability of simultaneously writing and displaying varying information, storing, and later retrieving the information, by displaying the information, has many applications.

As shown in FIG. 3, a series of MC films MCMi are shown as mounted on a rotatable turret 23. After a given information has been written upon one of these films and displayed, the turret may be rotated to provide a new film such as MCM2 and so on. When it is desired to again display the information on film MCM1, the turret is rotated in an opposite direction to place this film in the optical path of the system and only the primary radiation is utilized to again display the information. Because of the extremely small space required for writing and storing a particular image, a plurality of such images may be stored on any one film such as images representing a given sequence of events. Furthermore, the specific information in a given image may be erased by an erasing beam B3 of infrared radiation from source S3 which is projected by writing lens 30 onto the MC material at MCM1, in a manner similar to that utilized for the ultraviolet writing beam; or the entire sequence of images at a given MCMi can be erased by increasing the temperature of that particular film in a manner as described above in reference to FIG. 1. In practice, light sources S1, S2 and S3 may be combined as a single source with appropriate filter systems for the various light beams.

With the present disclosure in view, modifications of the invention will appear to those skilled in the art; and accordingly it is not desired to be limited to the exact details of the illustrated preferred embodiments.

What is claimed is:

1. An information-display system adapted to effect alteration of an image of an object and simultaneously display said altered image, said system comprising: first means, including means to form a beam of light of frequencies within a first waveband, said beam containing information representing an image of an object; second means disposed in the path of said beam of light and including metachromatic means characterized by point-to-point variations in the transmissivity thereof in response to light of frequencies in a second waveband; third means disposed in the optical path of said light beam between said first means and said second means and including first imaging means for producing and directing onto a first image plane a reduced image of said object, said metachromatic means being adapted to reside in said first image plane, fourth means, so disposed as to be optically accessible to said metachromatic means and including means for producing and directing onto said metachromatic means, light of frequencies in said second waveband which includes, as its major portion, frequencies not in said first waveband and which when present induces point-to-point variations in the transmissivity of said metachromatic means to alter the image transiting therethrough; controllable means for regulating the intensity of the light in said second waveband supplied by said fourth means, to controllably regulate the variable transmissivity of said metachromatic means; and display means including a second image plane and disposed in optical alignment with said metachromatic means, for receiving from said first image plane and projecting onto said second image plane the information imparted to said light of frequencies within said first waveband and altered by said metachromatic means.

2. A system according to claim 1 wherein said first imaging means includes variable reducing means for controllably varying the reduction of the image projected upon said metachromatic means; and said controllable means for regulating the intensity of the light within said second waveband includes variable reducing means for projecting a second reduced image onto said metachromatic means, said second image representing the information contained in said second waveband.

3. A system according to claim 1 wherein said fourth means includes ultraviolet means for producing and directing onto said metachromatic means light of frequencies in the ultraviolet portion of the electromagnetic wave spectrum and infrared means for producing and directing onto said metachromatic means light of frequencies in the infrared portion of the electromagnetic spectrum.

4. An optical information-display system comprising: first means, including a light-source means for producing an information containing beam of light representing an image of an object; second means, disposed in the path of said beam of light and including optical imaging means for producing in a first image plane an image representative of the object through which said beam of light passes; third means, disposed in said first image plane and including variable metachromatic optical means characterized by point-to-point variations in the transmissivity thereof in response to auxiliary radiation; fourth means, for introducing into said beam of light before said optical imaging means, time varying auxiliary radiation to be supplied to said metachromatic means; said optical imaging means including controllable means for varying the image size for regulation of the intensity of the auxiliary radiation supplied to said metachromatic means, and means for projecting the resulting image on said metachromatic means at said first image plane onto a second image plane for display thereof.

5. A system according to claim 4 wherein said optical imaging means includes reduction means to project a substantially reduced image upon said metachromatic means.

6. An information-display and storage system adapted to effect alteration of an image of an object and simultaneously display and store said altered image, said system comprising: first means, including means to form a beam of light of frequencies within a first waveband, said beam containing information representing an image of an object; second means disposed adjacent to the path of said beam of light and including a series of metachromatic means, said second means being adapted for introducing a first of said series of metachromatic means into the path of said beam of light at a given position; third means disposed in the optical path of said light beam between said first means and said given position and including imaging means for producing and directing onto a first image plane a reduced image of said object, said first image plane residing at said given position in the optical path, fourth means, so disposed as to be optically accessible to said metachromatic means and including means for producing and directing onto said metachromatic means, light of frequencies in a second waveband which includes, as its major portion, frequencies not in said first waveband and which, when present, induces point-to-point variations in the transmissivity of said metachromatic means to alter said image transiting therethrough; and display means disposed in optical alignment with said metachromatic means for receiving said altered image from said first image plane for projection onto a second image plane; said second means being adapted for a removal of said first metachromatic means from said beam of light and replacement therefor by a second of said series of metachromatic means.

7. A system according to claim 6 wherein said third means includes reduction means for projecting a substantially reduced image upon said metachromatic means.

8. A system according to claim 6 wherein said second means includes controllably variable heating means in close proximity of said metachromatic means for varying the temperature of said metachromatic means.

9. An information-display and storage system adapted to simultaneously effect alteration of an image of an object and store said altered image, said system comprising: first means, including means to form a beam of light of frequencies within a given waveband, said beam containing information representing an image of said object; second means disposed adjacent to the path of said beam of light and including a series of metachromatic means, characterized by point-to-point variations in the transmissivity thereof in response to light of frequencies in said waveband; said second means being adapted to introduce at a given position in said beam of light a first of said series of metachromatic means; third means disposed in the optical path of said light beam between said first means and said given position and including imaging means for producing and directing onto the selected metachromatic means in said given position a reduced image of the object represented by the information in said beam; said second means being operative to permit the metachromatic means at said given position to be replaced by any of the other of said metachromatic means; and means for projecting the resulting image on said metachromatic means onto a second image plane for display thereof.

10. An optical information-display system for the selectively sustained display of changing graphic information said system comprising: first means, including a light source means for producing an information-containing beam of light; second means, disposed in said information beam of light and including imaging means for producing in a first image plane an optical image representative of the information contained in said beam of light; image altering means, including metachromatic means disposed in said first image plane for receiving and transmitting said image, said metachromatic means being characterized by formation of opaque configurations therein in response to auxiliary radiation and the retention of such configurations for a selected time duration; a variable auxiliary-radiation source and supply means constructed and arranged to supply a beam of said auxiliary radiation containing additional information represented by said configurations; and display means including a second image plane and projection means for receiving said image as altered by said configuration from said first image plane for projection of said altered image onto said second image plane.

11. An optical information-display system for the selectively sustained display of changing graphic information, said system comprising: first means for providing a beam of light of frequencies within a first waveband; second means disposed in the path of said beam of light and including metachromatic means constituting a first image plane and characterized by the formation therein of opaque configurations in response to light of frequencies in a second waveband and the retention of such configurations for a selected time duration; a variable auxiliary-radiation source and supply a beam of means constructed and arranged to supply exciting time varying auxiliary-radiation of frequencies in said second waveband, said auxiliary-radiation beam containing information in the form of said configurations; imaging means disposed in the path of said auxiliary radiation and arranged to produce an optical image of said configurations for projection onto said metachromatic means; and, display means including a second image plane and projection means utilizing the light beam of said first means for projecting the configurations formed on said metachromatic means by said auxiliary radiation onto said second image plane.

12. An optical information display system for the selectively sustained display of changing graphic information, said system comprising: first means including a light source means and an object for producing a beam of light containing invariable information; second means, disposed in said invariable information-containing beam of light and including imaging means for producing in a first image plane an optical image representative of said object; image altering means including metachromatic means disposed in said first image plane for receiving and transmitting said image, said metachromatic means being characterized by the formation therein of opaque configurations, representative of changing information, in response to auxiliary radiation and the retention of such configurations for a selected time duration; a controllable auxiliary-radiation source for producing said configurations on said metachromatic means by applying said auxiliary radiation thereto; and, display means including a second image plane and projection means for receiving from said first image plane the altered image as transmitted through said metachromatic means and projecting said altered image onto said second image plane.

13. An optical information display system comprising: first means for producing a beam of light, a metachromatic means in the path of said beam, an auxiliary radiation producing means, imaging means disposed in the path of said auxiliary radiation means for focusing an image of a time varying object on said metachromatic means, said metachromatic means being characterized by a point-to-point variation in its transmissivity with respect to light from said first means in response to the auxiliary radiation produced by said auxiliary radiation producing means, and display means including projecting means for projecting the image formed on said metachromatic means by said auxiliary radiation means onto an image plane for display thereof.

14. An optical information-display system comprising: first means, including a light-source means and an object, for producing an information-containing beam of light; second means, disposed in said information-containing beam of light and including imaging means for producing in a first image plane an optical image representation of the object through which said beam of light passes; image altering means including metachromatic means disposed in said first image plane and also including a variable auxiliary-radiation source, said metachromatic means being characterized by a point-to-point variation of the transmissivity thereof in response to the auxiliary radiation produced by said auxiliary-radiation source; and display means including a second image plane and projection means for receiving the resultant image in said first image plane and for projecting the resultant image onto said second image plane.

15. A system according to claim 14 wherein said variable auxiliary-radiation source includes a cathode ray tube adapted and arranged to supply auxiliary radiation to said metachromatic means for point-to-point variation of the transmissivity thereof.

16. A system according to claim 14 wherein the variable auxiliary-radiation source includes optical means for providing a plurality of beams of exciting auxiliary radiation to the metachromatic means for a point-to-point variation of the transmissivity thereof.

17. An optical information display system for the selectively sustained display of changing graphic information, said system comprising: a light-source means and an object for producing a beam of light containing information; second means disposed in said information-containing beam of light and including imaging means for producing in a first image plane an optical image representation of the object through which said beam of light passes; image altering means including metachromatic means disposed in said first image plane for receiving and transmitting said image and also including variable auxiliary-radiation producing means, said metachromatic means being characterized by the formation therein of reversible opaque patterns in response to the auxiliary radiation produced by said auxiliary-radiation producing means and the retention of such patterns for a selected time duration; and display means including a second image plane and projection means for receiving the altered image from said first image plane transmitted through said reversible opaque patterns of said metachromatic means and projecting said altered image onto said second image plane.

References Cited in the file of this patent

UNITED STATES PATENTS

| | | |
|---|---|---|
| 2,186,942 | Vierling | Jan. 16, 1940 |
| 2,330,171 | Rosenthal | Sept. 21, 1943 |
| 2,335,659 | Fraenckel et al. | Nov. 30, 1943 |
| 2,515,263 | Raibourn | July 18, 1950 |
| 2,710,274 | Kuehl | June 7, 1955 |
| 2,842,025 | Craig | July 8, 1958 |
| 2,895,892 | Chalkley | July 21, 1959 |
| 2,953,454 | Berman | Sept. 20, 1960 |
| 2,961,921 | Lingg et al. | Nov. 29, 1960 |
| 2,988,978 | Craig | June 20, 1961 |
| 3,085,469 | Carlson | Apr. 16, 1963 |

OTHER REFERENCES

Hirshberg, Journal of the American Chemical Society, vol. 78, pp. 2304–2312, May 20, 1956. Copy in Scientific Library and Div. 7, 88/107.

UNITED STATES PATENT OFFICE
CERTIFICATE OF CORRECTION

Patent No. 3,134,297 May 26, 1964

Carl O. Carlson et al.

It is hereby certified that error appears in the above numbered patent requiring correction and that the said Letters Patent should read as corrected below.

Column 1, line 42, for "expsure" read -- exposure --; column 2, lines 11 and 12, for "verying" read -- varying --; line 51, for "alternation" read -- alteration --; column 4, line 33, for "EAR" read -- EAB --; column 6, line 45, for "plane," read -- plane; --.

Signed and sealed this 29th day of September 1964.

(SEAL)
Attest:

ERNEST W. SWIDER
Attesting Officer

EDWARD J. BRENNER
Commissioner of Patents